US011390307B2

(12) United States Patent
Reinhart et al.

(10) Patent No.: US 11,390,307 B2
(45) Date of Patent: Jul. 19, 2022

(54) EXTRA LARGE TOTE WITH WHEELS AND LID COMBINATION

(71) Applicant: CREATIVE PLASTIC CONCEPTS, LLC, Sycamore, OH (US)

(72) Inventors: Nickolas Reinhart, Findlay, OH (US); Jacob H. Whitta, Findlay, OH (US)

(73) Assignee: CREATIVE PLASTIC CONCEPTS, LLC, Sycamore, OH (US)

( * ) Notice: Subject to any disclaimer, the term of this patent is extended or adjusted under 35 U.S.C. 154(b) by 40 days.

(21) Appl. No.: 17/007,747

(22) Filed: Aug. 31, 2020

(65) Prior Publication Data

US 2021/0129884 A1    May 6, 2021

Related U.S. Application Data

(60) Provisional application No. 62/928,026, filed on Oct. 30, 2019.

(51) Int. Cl.
*B62B 1/24* (2006.01)
*B62B 1/00* (2006.01)
*B62B 5/06* (2006.01)

(52) U.S. Cl.
CPC ............. *B62B 1/24* (2013.01); *B62B 1/006* (2013.01); *B62B 5/06* (2013.01)

(58) Field of Classification Search
None
See application file for complete search history.

(56) References Cited

U.S. PATENT DOCUMENTS

| 1,617 A | * | 5/1840 | Page | A01C 7/04 |
| | | | | 111/71 |
| 3,311,257 A | | 3/1967 | Puente | |
| 3,447,714 A | | 6/1969 | Elliot | |
| 5,564,805 A | * | 10/1996 | Dickinson | B25H 3/02 |
| | | | | 206/505 |
| 5,692,761 A | * | 12/1997 | Havlovitz | B62B 1/006 |
| | | | | 280/33.994 |
| 6,036,204 A | * | 3/2000 | Craft | B65F 1/1468 |
| | | | | 220/762 |

(Continued)

FOREIGN PATENT DOCUMENTS

| CA | 2628578 A1 | * 10/2008 | ............ B65F 1/1646 |
| CA | 2642062 A1 | * 4/2009 | ................ B65F 1/10 |

(Continued)

*Primary Examiner* — James A Shriver, II
*Assistant Examiner* — Ian Bryce Shelton
(74) *Attorney, Agent, or Firm* — Jacob M. Ward; Ward Law Office LLC (57) ABSTRACT

A tote has a hollow main body, a plurality of wheels, and an axle. The hollow main body has a plurality of side walls and a base wall. The base wall defines an open top and a cavity. The open top is circumscribed by a rim. The open top is configured to be covered by a lid. The base wall is bounded by the plurality of side walls. The base wall also includes a pair of outer wheel wells and a central wheel well. The central wheel well is disposed between the outer wheel wells and separated from the outer wheel wells by axle supports. Each of the plurality of wheels is disposed in one of the outer wheel wells and the central wheel well. The axle is connected to each of the wheels. The axle is rotatably supported by the axle supports of the hollow main body.

18 Claims, 7 Drawing Sheets

(56) References Cited

U.S. PATENT DOCUMENTS

| | | |
|---|---|---|
| 6,536,787 B1 * | 3/2003 | Shick .................. A45C 5/14 190/18 A |
| D648,538 S | 11/2011 | Reinhart et al. |
| 9,096,097 B2 * | 8/2015 | Trent, III .............. B65F 1/1473 |
| D743,171 S | 11/2015 | Reinhart |
| D744,239 S | 12/2015 | Reinhart |
| D744,240 S | 12/2015 | Reinhart |
| D756,652 S | 5/2016 | Reinhart |
| D765,397 S | 9/2016 | Reinhart |
| D765,407 S | 9/2016 | Reinhart |
| D765,408 S | 9/2016 | Reinhart |
| D765,409 S | 9/2016 | Reinhart |
| D765,410 S | 9/2016 | Reinhart |
| D765,411 S | 9/2016 | Reinhart |
| D766,577 S | 9/2016 | Reinhart |
| D768,385 S | 10/2016 | Reinhart |
| D773,821 S | 12/2016 | Reinhart |
| D776,932 S | 1/2017 | Reinhart |
| 9,550,605 B1 * | 1/2017 | Summers ................ B62B 1/008 |
| D781,586 S | 5/2017 | Reinhart |
| D790,858 S | 7/2017 | Reinhart |
| D792,105 S | 7/2017 | Reinhart |
| D794,958 S | 8/2017 | Reinhart |
| D816,492 S | 5/2018 | Reinhart |
| 10,053,126 B2 * | 8/2018 | Buttimer ................. B62B 3/08 |
| D834,315 S | 11/2018 | Reinhart |
| D836,914 S | 1/2019 | Reinhart |
| D838,982 S | 1/2019 | Reinhart |
| 10,399,748 B2 | 9/2019 | Reinhart |
| D878,054 S | 3/2020 | Reinhart et al. |
| D881,576 S | 4/2020 | Reinhart et al. |
| 10,843,852 B2 | 11/2020 | Reinhart et al. |
| 10,858,029 B2 * | 12/2020 | Bohlman ................ A45C 5/143 |
| 2006/0201943 A1 * | 9/2006 | Uffner ..................... B60B 33/08 220/23.83 |
| 2006/0208439 A1 * | 9/2006 | Depasquale ............ B62B 1/006 280/47.17 |
| 2007/0235962 A1 * | 10/2007 | Jamie ....................... B62B 1/26 280/47.26 |
| 2007/0235963 A1 * | 10/2007 | Killinger ............ B65D 21/0233 280/47.26 |
| 2008/0309036 A1 * | 12/2008 | Overland ................. A45C 3/04 280/33.992 |
| 2012/0326405 A1 * | 12/2012 | Overland ................. B62B 1/125 280/33.998 |
| 2014/0027993 A1 * | 1/2014 | Lee .......................... B62B 1/22 280/47.131 |
| 2014/0210171 A1 * | 7/2014 | Sebastian ................ A47F 10/04 280/33.998 |
| 2016/0107803 A1 * | 4/2016 | Reinhart ............ B65D 43/0208 220/315 |
| 2017/0174112 A1 * | 6/2017 | Sadinski ................... B62B 3/12 |
| 2018/0009101 A1 * | 1/2018 | Piccininni ................. B62B 3/16 |

FOREIGN PATENT DOCUMENTS

| | | | | |
|---|---|---|---|---|
| CN | 203143200 U | * | 8/2013 | |
| DE | 20205928 U1 | * | 7/2002 | ............ B65F 1/1473 |
| DE | 202012006257 U1 | * | 8/2012 | ............ B65D 25/20 |
| EP | 2179907 A1 | * | 4/2010 | ............ B62B 3/165 |
| ES | 1079120 U | * | 4/2013 | |
| GB | 2438189 A | * | 11/2007 | ............... A45C 5/14 |
| JP | H08150259 A | * | 6/1996 | |

* cited by examiner

EXTRA LARGE TOTE WITH WHEELS AND LID COMBINATION

CROSS-REFERENCE TO RELATED APPLICATIONS

This application claims the benefit of U.S. Provisional Application No. 62/928,026, filed on Oct. 30, 2019. The entire disclosure of the above application is incorporated herein by reference.

FIELD

The present disclosure relates to the field of storage totes and, more particularly, to stackable storage totes.

INTRODUCTION

In recent years, consumers have become more and more concerned with the aesthetic appearance and functionality of garages, basements, closets, sheds, and other areas in which items tend to accumulate. As a result, consumers have invested vast sums of money on storage totes to store and organize accumulated items. Unfortunately, traditional storage totes are limited in their ability to provide an aesthetically appealing storage and organizational option which is both sturdy and stackable.

Known stackable totes are described in, for example, U.S. Pat. No. 3,447,714, which is directed to a non-circular, stackable lid and container combination that enables a user to easily open the lid. Similarly, U.S. Pat. No. 3,311,257 discloses a tote that can be stacked with other totes of similar construction to permit stacks of totes. Undesirably the stackable totes from the prior art are either too small, resulting in inadequate storage, or too heavy, thus not facilitating easy repositioning.

There is a continuing need for a tote and lid combination that facilitates stacking and has an adequate storage capacity. Desirably, the tote and lid combination facilitates a pulling of the tote and lid combination.

SUMMARY

In concordance with the instant disclosure, a tote and lid combination that facilitates stacking and has an adequate storage capacity, and which facilitates a pulling of the tote and lid combination, has been surprisingly discovered.

This disclosure deals primarily with storage totes. However, it should be appreciated that a skilled artisan can apply the present disclosure to other types of storage containers, as desired.

In one embodiment, a tote has a hollow main body, a plurality of wheels, and an axle. The hollow main body has a plurality of side walls and a base wall. The base wall defines an open top and a cavity. The open top is circumscribed by a rim. The open top is configured to be covered by a lid. The base wall is bounded by the plurality of side walls. The base wall also includes a pair of outer wheel wells and a central wheel well. The central wheel well is disposed between the outer wheel wells and separated from the outer wheel wells by axle supports. Each of the plurality of wheels is disposed in one of the outer wheel wells and the central wheel well. The axle is connected to each of the wheels. The axle is rotatably supported by the axle supports of the hollow main body.

In another embodiment, a stacked combination of totes includes a first tote and a second tote. Each of the first tote and the second tote have a hollow main body, a plurality of wheels, and an axle. The hollow main body has a plurality of side walls and a base wall. The base wall defines an open top and a cavity. The open top is circumscribed by a rim. The open top is configured to be covered by a lid. The base wall is bounded by the plurality of side walls. The base wall also includes a pair of outer wheel wells and a central wheel well. The central wheel well is disposed between the outer wheel wells and separated from the outer wheel wells by axle supports. The plurality of wheels includes a pair of outer wheels and a central wheel well. Each of the pair of outer wheels is disposed in one of the outer wheel wells. The central wheel is disposed in the central wheel well. The axle is connected to each of the wheels. The axle is rotatably supported by the axle supports of the hollow main body. The first tote is disposed inside the cavity of the second tote. Each of the pair of outer wheels of the first tote contacts and rests on one of the pair of outer wheel wells of the second tote. The central wheel of the first tote contacts and rests on the central wheel well of the second tote.

In a further embodiment, a tote and lid combination includes a tote and a lid. The tote has a hollow main body, a plurality of wheels, and an axle. The hollow main body has a plurality of side walls and a base wall. The base wall defines an open top and a cavity. The open top is circumscribed by a rim. The open top is configured to be covered by a lid. The base wall is bounded by the plurality of side walls. The base wall also includes a pair of outer wheel wells and a central wheel well. The central wheel well is disposed between the outer wheel wells and separated from the outer wheel wells by axle supports. The plurality of wheels includes a pair of outer wheels and a central wheel well. Each of the pair of outer wheels is disposed in one of the outer wheel wells. The central wheel is disposed in the central wheel well. The axle is connected to each of the wheels. The axle is rotatably supported by the axle supports of the hollow main body. The lid has a main body. The main body is selectively disposed over the open top of the tote.

In an exemplary embodiment, a tote can include a main body. The main body can have a base wall and a plurality of side walls. The main body can have a top edge, which can be circumscribed by a lip. The lip can be configured to receive a lid. The base wall can have a ridge disposed therein. More particularly, base wall can have a plurality of ridges disposed parallel to one another. The main body can further include a wheel well and a plurality of wheels. The wheel well can be disposed through the plurality of side walls.

The wheel well can include a plurality of recesses. Each of the recesses can be evenly spaced apart along a length of the wheel well. Each of the recesses can be configured to receive a part of a wheel. In an exemplary embodiment, the wheel well can have three wheels. Each one of the wheels disposed in one of three recesses.

The three recesses can include a central recess and a pair of side recesses. The side recesses can be disposed adjacent to parallel side walls. The central recess can be disposed at a mid-point between each of the pair of side recesses. Accordingly, a central wheel can be disposed in the central wheel well, and a wheel can be disposed in each of the side recesses.

The central recess can be connected to each of the side recesses via a channel. Each channel can be configured to receive an axle. Each axle can have a first channel side disposed in a side wheel and an other end disposed in the central wheel. In operation, the axles allow each of the wheels to move in unison when pulled by a user.

The tote can have a pair of handles disposed in the top edge of the side wall opposite the wheel well. Each of the handles can be substantially D shaped. Each of the handles can extend outwardly from the top edge. The lid can have corresponding handles, such that the handles of the lid cover the handles of the tote where the tote and lid are in the engaged position. Advantageously, the user can utilize the handles of the tote regardless of the use of the lid.

It should be appreciated that the handles allow the user to tilt the tote about the wheels and pull the tote. Advantageously, the wheels and the handles, in combination, allow a user to move the tote without lifting the entire weight of the tote, as desired.

The tote can have a plurality of locking components disposed into the top edge. The lid can have a plurality of corresponding locking components. Where the tote and lid are in the engaged position, the locking components are directly aligned, such that, the locking components can receive a latch. Advantageously, the latch can secure the tote and lid in the engaged position. Thus, the latch militates against the tote and the lid becoming undesirably separated in use. A skilled artisan can select any suitable method for securing the tote and lid, as desired.

The lid can have a plurality of stacking supports disposed thereon. The stacking supports can be configured to add support to the lid. The stacking supports allow multiple tote and lid combination to be stacked while militating against undesirable moving of the combination or undesirable sagging of the lid.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

As herein, the term "tote" includes a plastic storage tote. However, it should be appreciated that storage containers made of different materials are contemplated and can therefore be included within the scope of this disclosure.

With reference to FIGS. 1-9, a tote 100 is shown. The tote 100 has a hollow main body 102, a plurality of wheels 104, and an axle 106. The hollow main body 102 can be manufactured from plastic through injection molding or blow molding processes. However, it should be appreciated that other processes and types of materials can be employed by a skilled artisan, for example, where the tote 100 can be formed and shaped from various metals such as aluminum.

Figure 1:
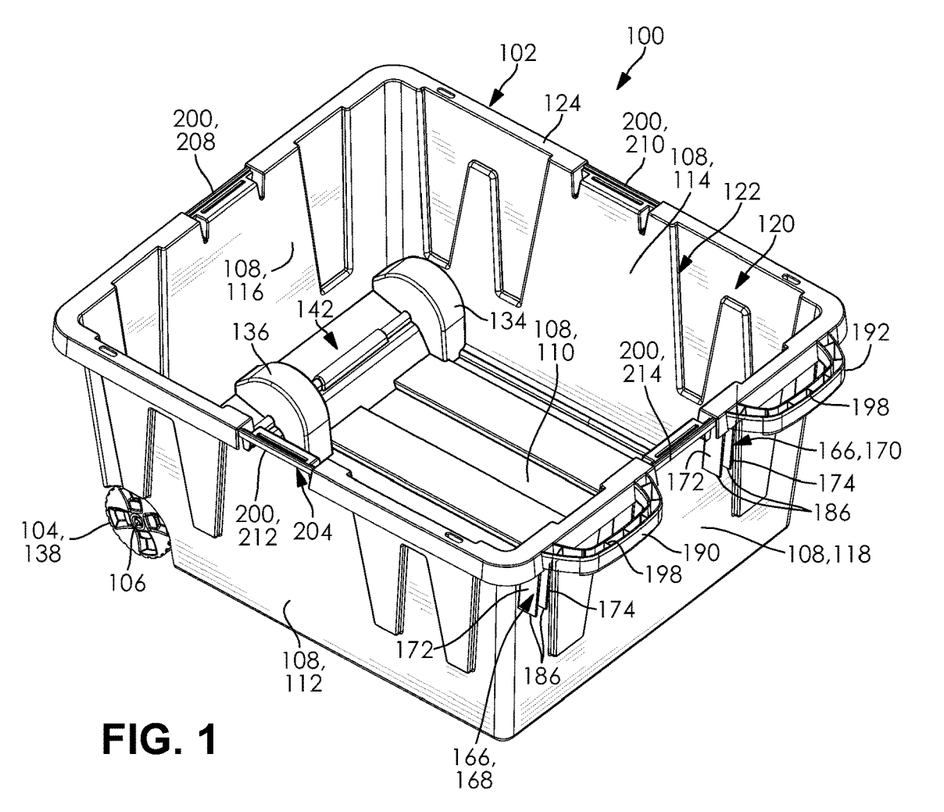
FIG. 1 is a top perspective view of a tote, according to one embodiment, and further showing a plurality of latches.

Now referring to FIG. 1, the hollow main body 102 can have a plurality of side walls 108 and a base wall 110. The base wall 110 can be bounded by the plurality of side walls. In particular examples, the plurality of side walls 108 can include a left side wall 112, a right side wall 114, a rear side wall 116, and a front side wall 118.

The base wall 110 defines an open top 120 and a cavity 122 by being bound by the plurality of side walls 108. The open top 120 can be configured to permit items to be passthrough into the cavity 122. The open top 120 can be circumscribed by a rim 124. The cavity 122 can be configured to selectively store items.

Figure 2:
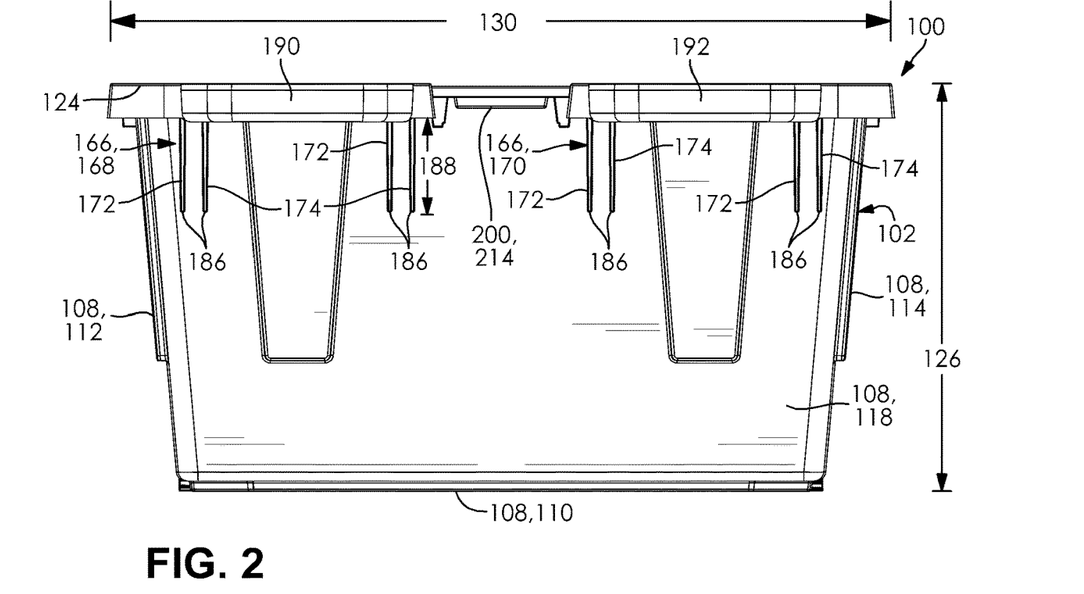
FIG. 2 is a front elevational view of the tote shown in FIG. 1, and further showing a plurality of stacking supports.
Figure 3:
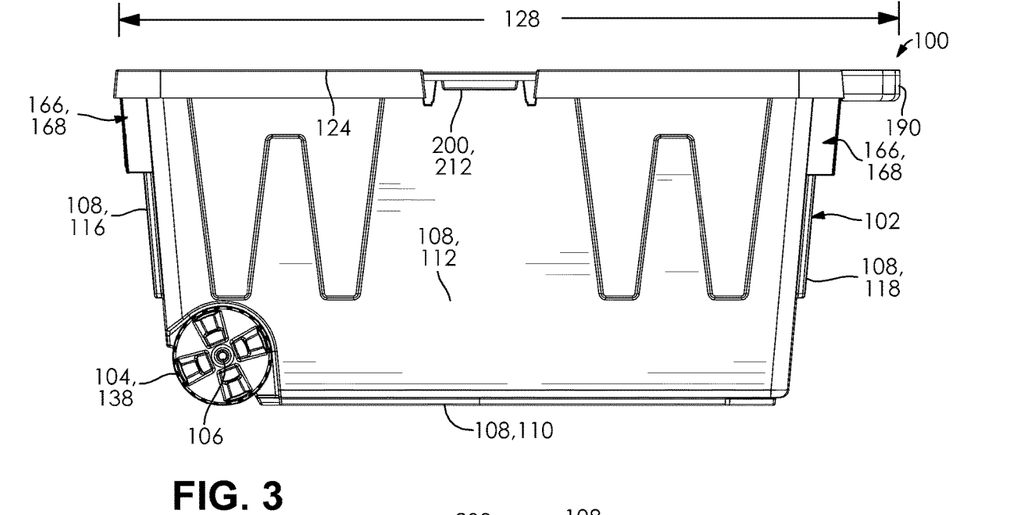
FIG. 3 is left side elevational view of the tote shown in FIG. 1, and further showing one of a pair of outer wheels.

In specific examples, the hollow main body has a body height 126, a body length 128, and a body width 130. As shown in FIG. 2, the body height 126 can be defined by distance between the base wall 110 and the rim 124. The body height can be about twenty (e.g., 20.250) inches. With reference to FIG. 3, the body length 128 can be defined by the distance between the rear side wall 116 and a tote handle 190. The body length 128 can be about forty-seven (e.g., 47.368) inches. The body width 130 can be defined by the distance between the left side wall 112 and the right side wall 114, as shown in FIG. 2. The body width 130 can be about thirty-nine (e.g., 39.102) inches. Although these dimensions have shown to be useful, a skilled artisan can select different dimensions for the body height 126, the body length 128, and the body width 130, within the scope of this disclosure.

Now referring to FIGS. 1, 4, 5-6, and FIG. 7, the base wall 110 can further include a pair of outer wheel wells 134 and a central wheel well 136. The pair of outer wheel wells 134 can be disposed in the base wall 110 and adjacent to the rear side wall 116. The central wheel well 136 is disposed between the outer wheel wells, in the base wall 110, and adjacent to the rear side wall 116. It should be appreciated that one skilled in the art can scale the number of wheel wells, as desired.

Figure 7:
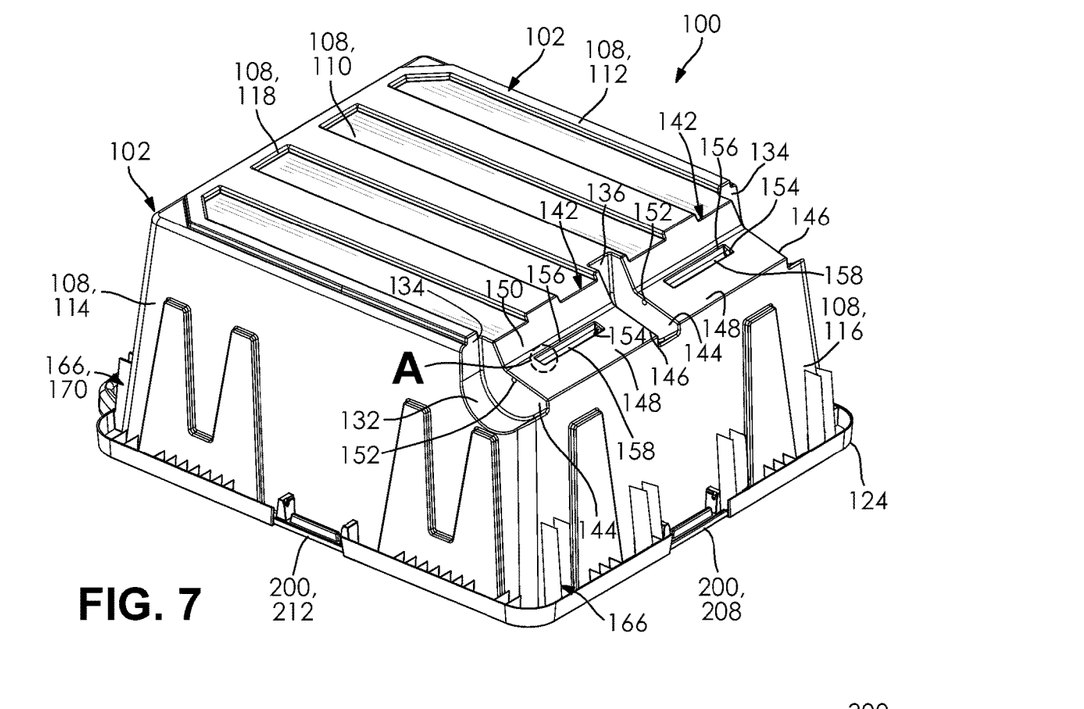
FIG. 7 is a bottom perspective view of the tote shown in FIG. 1 with the wheels and axle removed, and further showing the pair of outer wheel wells, the central wheel well, and the axle supports.

In some examples, each of the pair of outer wheel wells 134 and the central wheel well 136 has an arched wall 132, shown in particular in FIG. 7. Desirably, the arched wall 132 can conform to each of the plurality of wheels. Although it should be appreciated that a skilled artisan can employ wheel wells having different curvatures.

Figure 5:
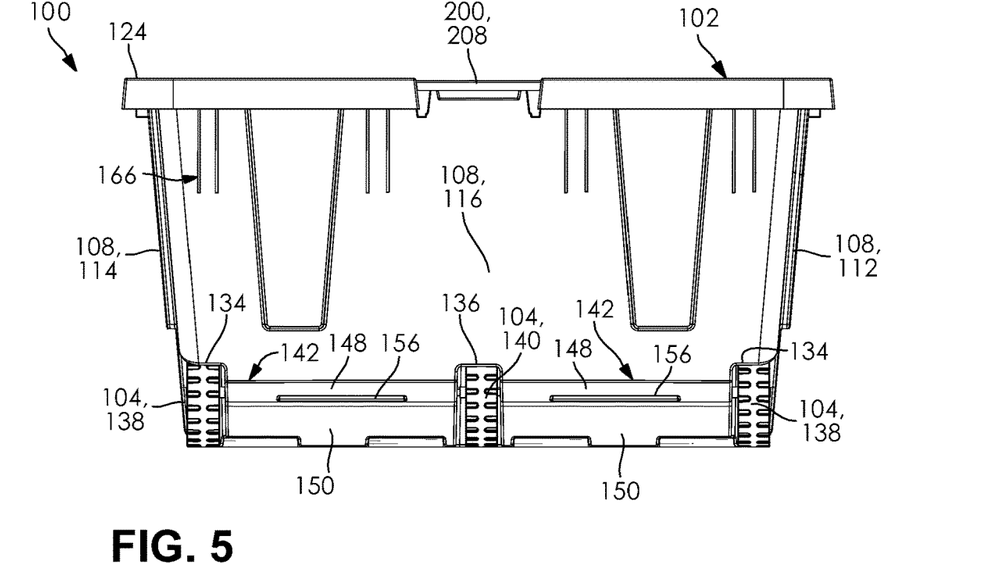
FIG. 5 is a rear elevational view of the tote shown in FIG. 1, and further showing a central wheel, the pair of outer wheels.
Figure 6:
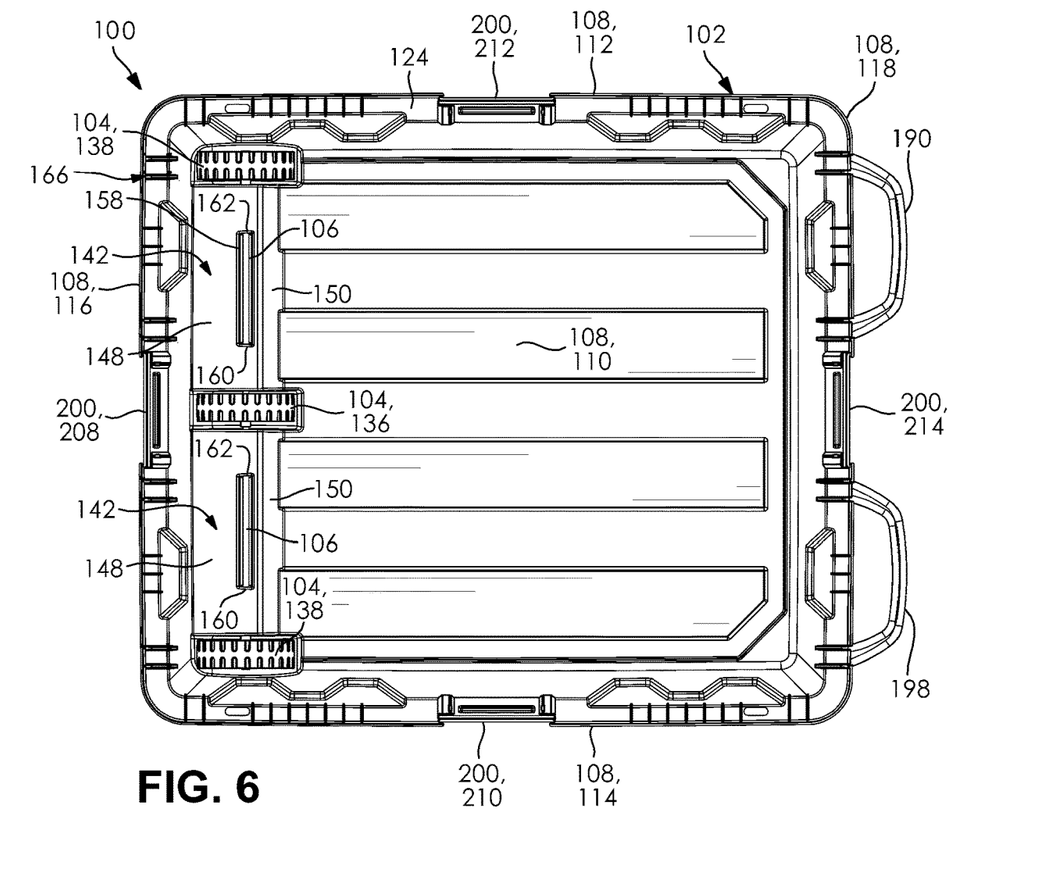
FIG. 6 is a bottom plan view of the tote shown in FIG. 1, and further showing an axle, and axle supports.

With reference to FIG. 5-6, each of the plurality of wheels 104 can be disposed in one of the pair of outer wheel wells 134 and the central wheel well 136. In specific examples, the plurality of wheels include a pair of outer wheels 138 and a central wheel 140. Each of the pair of outer wheels 138 can be disposed in one of the pair of outer wheel wells 134. The central wheel 140 can be disposed in the central wheel well 136.

The axle 106 can be connected to each of plurality of wheels 104, as shown in FIG. 5. Advantageously, this allows for the tote 100 to be easily moved to different storage locations. It is believed without being bound to a particular theory that having the pair of outer wheel wells, the central wheel well, and the plurality of wheels 104 permits the tote 100 to have more stability when being moved. In addition, it is also believed without being bound to a particular theory, that the cavity 122 of the tote 100 can be larger due to the increased stability from having the pair of outer wheels 138 and the central wheel 140. For instance, the central wheel 140 can allow a greater distance between the pair of outer wheels 138 and militate against structural deformation of the axle 106 and/or deformation of one or more portions of the tote 100 when under load.

Now referring to FIGS. 1, 4, and 6-7, the central wheel well 136 can be separated by the pair of outer wheel wells 134 by axle supports 142. The axle supports 142 are configured to rotatably support the axle 106. Each of the axle supports 142 can be disposed in the base wall 110 and adjacent to the rear side wall 116.

As shown particularly in FIGS. 6-7, each of the axle supports 142 can have a first axle side wall 144, a second axle side wall 146, and an angled rear wall 148. The angled rear wall 148 connects the first axle side wall 144 and the second axle side wall 146. The angled rear wall 148 can be disposed intermediate the rear side wall 116 and the base wall 110. Advantageously, the angled rear wall 148 reduces the amount of material needed to produce the axle supports 142 and can also allow the tote to be tilted. For example, a user can pull the front side wall 118 upwardly to pull the tote to a different location. The angled rear wall 148 militates against the axle support from touching the ground when the tote 100 is being tilted and pulled to a new location.

While still referring to FIGS. 6-7, the angled rear wall 148 can further include a second angled rear wall 150. The second angled rear wall 150 can extend upwardly from the base wall 110 towards the rim 124. The angled rear wall 148 can be formed between the second angled rear wall 150 and the rear side wall 116. It should be appreciated that a person skilled in the art can scale the number of the angled rear walls 148, within the scope of this disclosure.

As shown chiefly in FIG. 7, the first axle side wall 144 can include a first axle aperture 152 and the second axle side wall 146 can include a second axle aperture 154. The axle 106 can be disposed through both the first axle aperture 152 and the second axle aperture 154. It should be appreciated that a person skilled in the art can scale the number of apertures for the axle supports, within the scope of this disclosure. Both the first axle aperture 152 and the second axle aperture 154 are configured to ratably receive the axle 106.

While still referencing FIG. 7, the angled rear wall 148 has an open channel 156 with a curved backwall 158. The open channel 156 has a first channel side 160 and a second channel side 162. The open channel 156 can be in communication with the first axle aperture 152 and the second axle aperture 154, thereby permitting the open channel 156 to rotatably receive the axle 106. Advantageously, the open channel 156 reduces the amount of material needed to manufacture each of the axles supports 142.

Figure 15:
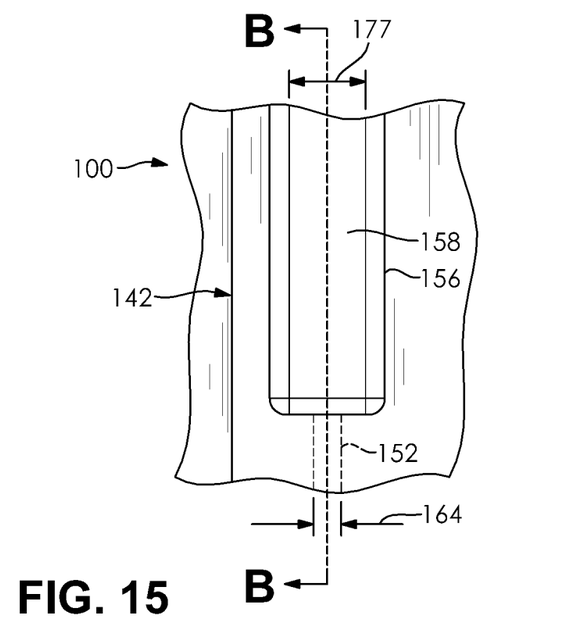
FIG. 15 is an enlarged fragmentary top plan view of the storage tote taken at call-out A in FIG. 7, and further illustrating a channel of the axle supports.
Figure 16:
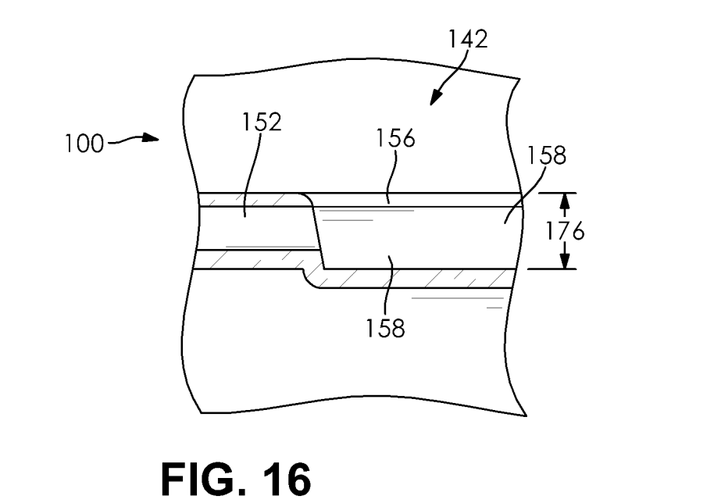
FIG. 16 is a cross-sectional side elevational view of the storage tote taken at section line B-B in FIG. 15.

In specific examples, the open channel 156 has a channel depth 176 and a channel width 177, as shown in FIGS. 15-16. The channel depth 176 can be defined by the distance between the curved backwall 158 and the angled rear wall 148. The channel width 177 can be defined by the distance between the first channel side 160 and the second channel side 162. In addition, each of the first axle aperture 152 and the second axle aperture 154 has an axle aperture diameter 164. The channel depth 176 and the channel width 177 can be greater than the axle aperture diameter 164.

It is believed without being bound to a particular theory that having the channel depth 176 and the channel width 177 be greater than the axle aperture diameter 164 militates against friction from forming with the axle 106 and the hollow main body 102. In addition, it is believed that this ratio facilitates in a better rotation of the axle 106 where the tote 100 is being transported.

In even more specific examples, the axle aperture diameter 164 can be 0.375 inches. Although this dimension for the axle aperture diameter 164 has been shown to be useful, one skilled in the art can select different dimensions for the axle aperture diameter 164, as desired.

Figure 8:
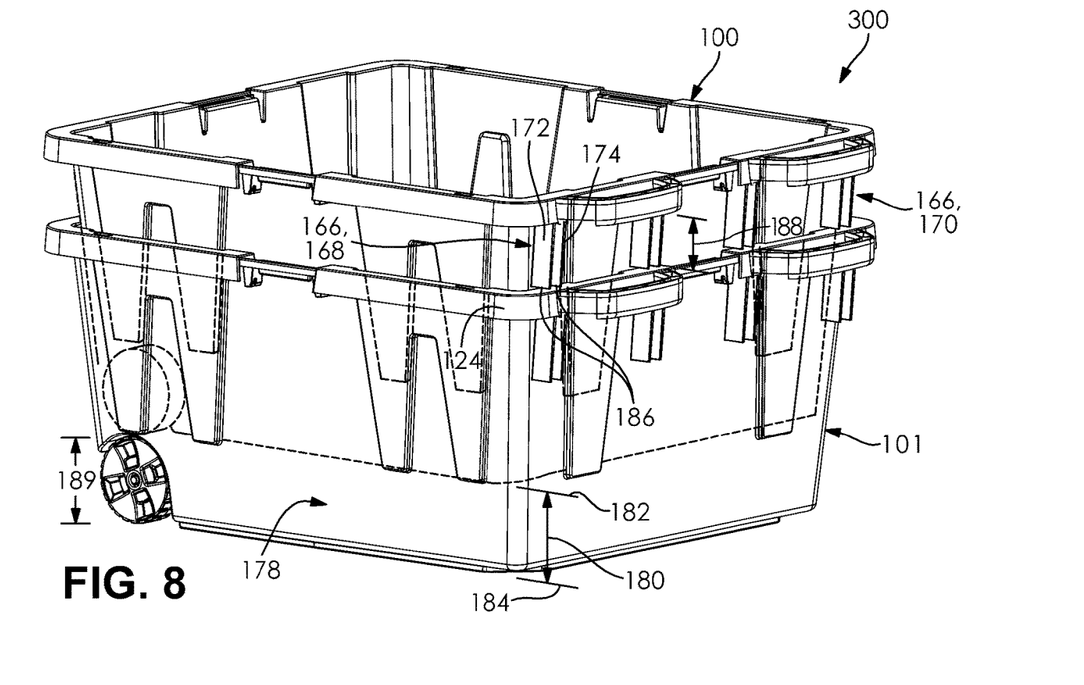
FIG. 8 is a stacking combination of totes, according to one embodiment, and further showing the tote disposed in a second tote.

With reference to FIG. 8, a stacking combination of totes 300 is shown. The stacking combination of totes 300 includes the tote 100 and a second tote 101. The second tote 101 can be identical to the tote 100. It should be appreciated that a skilled artisan can scale the number of totes being stacked in the stacking combination of totes 300.

In the stacking combination of totes 300, the tote 100 can be disposed inside the cavity 122 of the second tote 101. Each of the pair of outer wheels 138 of the tote 100 contacts and rests on one of the pair of outer wheel wells 134 of the second tote 101. Also, the central wheel 140 of the tote 100 contacts and rests on the central wheel well 136 of the second tote 101. Desirably, this allows the tote 100 to be stacked on top of the second tote 101.

Now referring to FIGS. 1-2, 3, and 7-9, the hollow main body 102 can further include a plurality of stacking supports 166. The plurality of stacking supports 166 can be configured to permit greater stability when stacking the tote 100 with a second tote 101, as shown in FIG. 8. In particular, it is believed that the plurality of stacking supports 166 can redistribute the pressure from the weight of the tote 100 on the second tote 100, when stacked. This can militate against the tote 100 from undesirably damaging the pair of outer wheels 138 and the central wheel well 136 of the second tote 101. The plurality of stacking supports can be disposed on at least one side wall of the plurality of side walls 108 of the hollow main body 102.

In specific examples, the plurality of stacking supports 166 can be disposed on the front side wall 118 and the rear side wall 116 of the hollow main body 102, shown particularly in FIGS. 2 and 5. In more specific examples, the plurality of stacking supports 166 includes a first set of stacking supports 168 and a second set of stacking supports 170. In even more specific examples, each of the first set of stacking supports 168 and the second set of stacking supports 170 has a first rib 172 and a second rib 174. The first rib 172 can be spaced apart from the second rib 174. It should be appreciated that a person skilled in the art can scale the number of the plurality of stacking supports, within the scope of this disclosure.

As shown in FIG. 8, where in the stacking combination of totes 300, each of the plurality of stacking supports 166 of the tote 100 contacts and rests on the rim 124 of the second tote 101. This causes the base wall 110 of the tote 100 and the base wall 110 of the second tote 101 to be spaced apart and define a gap 178 therebetween. The gap 178 has a gap length 180. The gap length can be defined by the distance between the base wall 110 of the tote 100 and the base wall 110 of the second tote 101.

In the stacking combination of totes 300, the base wall 110 of the tote 100 can be disposed on a first plane 182. In addition, the base wall 110 of the second tote 101 can be disposed on a second plane 184. The gap length 180 can be sufficient to permit the first plane 182 to be oriented substantially parallel to the second plane 184. Without being bound to a particular theory, it is believed that having the first plane 182 oriented substantially parallel to the second plane 184 facilitates greater stability and structural integrity to the stacking combination of totes 300.

While still referring to FIG. 8, each of the plurality of stacking supports 166 has a resting surface 186. The resting surface 186 can be spaced apart from the rim by a resting support distance 188. In addition, each of the pair of outer wheels 138 can have a wheel height 189. Where in the stacking combination of totes 300, the resting support distance 188 and the wheel height 189 permits the gap 178 to form between the base wall 110 of the tote 100 and the base wall 110 of the second tote 101. In some instances, the resting support distance 188 and the wheel height 189 can be the substantially the same as the gap length 180. It should be appreciated that a person skilled in the art can select different dimensions for the resting support distance 188, as desired.

Figure 9:
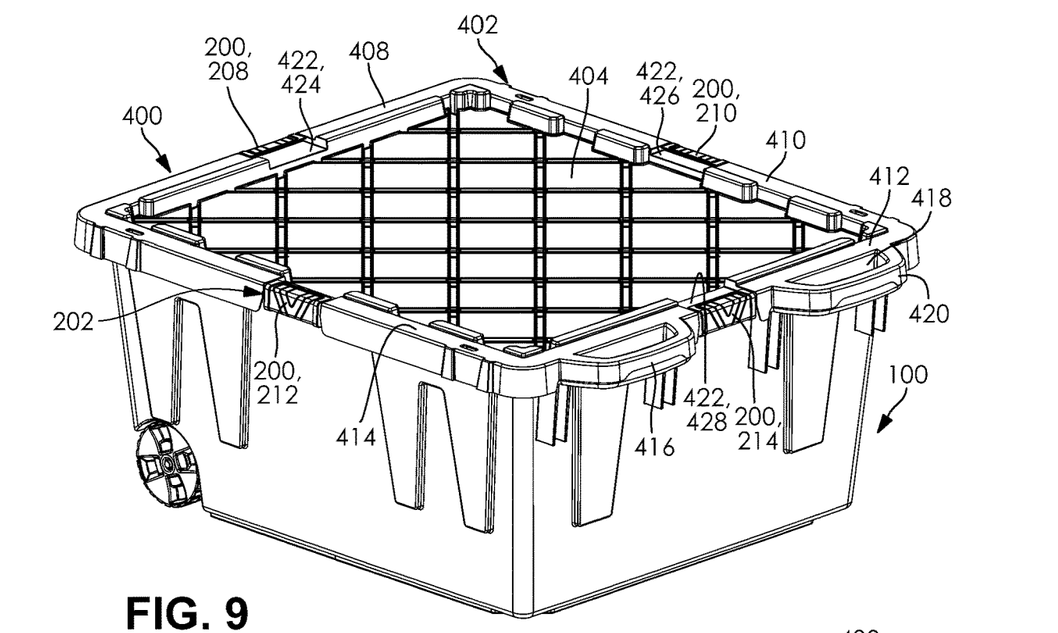
FIG. 9 is a top perspective view of the tote shown in FIG. 1, and further showing a lid disposed thereon.

As shown in FIG. 9, a lid 400 can be selectively disposed over the open top 120 of the tote 100. With reference to FIGS. 9-14, the lid 400 has a main body 402. The main body 402 can be manufactured from plastic through injection molding or blow molding processes. However, it should be appreciated that other processes and types of materials can be employed by a skilled artisan, for example, where the tote 100 can be formed and shaped from various metals such as aluminum. In some instances, the lid 400 can be provided to the consumer with the tote 100 as a tote and lid combination. In other instances, the lid 400 can be sold separately from the tote 100. In particular examples, the lid 400 has a top 404, a bottom 406, a first side 408, a second side 410, a third side 412, and a fourth side 414.

In some embodiments, the hollow main body 102 includes a tote handle 190, as shown in FIGS. 1-4 and 6-8. The tote handle 190 can be configured to allow gripping thereof to permit the tote 100 to be moved via pulling the tote handle 190. In specific examples, the tote handle 190 can be disposed on the front side wall 118 of the hollow main body 102.

While still referring to FIGS. 1-4 and 6-8, the tote 100 can further include a second tote handle 192. Desirably, this permits an additional gripping location to allow the tote 100 to be moved via pulling either the tote handle 190 or the second tote handle 192 or by pulling both the tote handle 190 and the second tote handle 192. It should be appreciated that additional tote handles can be included, as well as the size and shape of the tote handle 190 and/or the second tote handle 192 can be varied and considered within the scope of this disclosure.

Now referring to FIGS. 9-14, the main body 402 of the lid 400 can have a lid handle 416 disposed on an outer edge 418 of the main body 402 of the lid 400. The lid handle 416 can be configured to be aligned and conform with the tote handle 190 where the lid 400 can be disposed on the tote 100, as shown in FIG. 9. Advantageously, this permits the tote 100 to be more easily moved via gripping and pulling both the tote handle 190 and the lid handle 416 where the lid 400 can be disposed on the tote 100.

In some examples, the lid handle 416 includes a second lid handle 420. Desirably, this permits the tote 100 to be more easily moved via gripping and pulling both the lid handle 416 and the second lid handle 420. It should be appreciated that one skilled in the art can scale the number, size, and/or shape of the lid handle 416, as desired.

Figure 4:
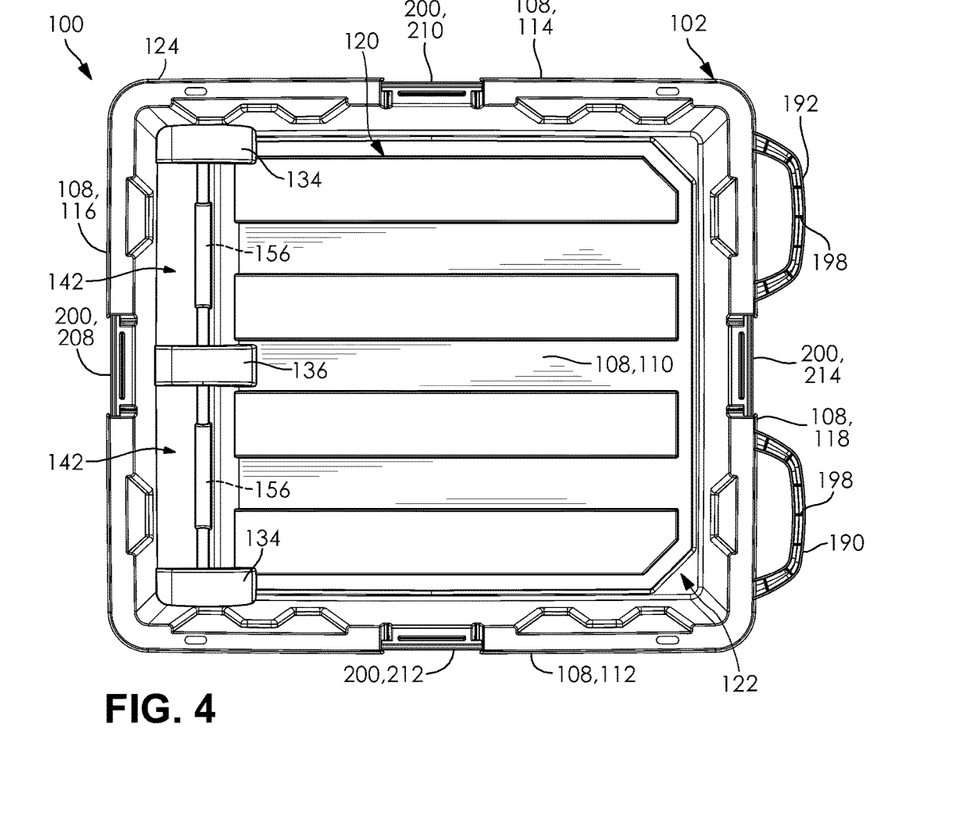
FIG. 4 is a top plan view of the tote shown in FIG. 1, and further showing a central wheel well and a pair of outer wheel wells.

With reference to FIG. 4, the tote handle 190 and the lid handle 416 can include a bracing 198 disposed therein. It is believed without being bound to a particular theory, that the bracing 198 facilitates a greater structural integrity for the tote handle 190 and the lid handle 416. It should be appreciated that one skilled in the art can scale the number of the bracing 198, as desired.

Now referring to FIGS. 1-8, the hollow main body 102 of the tote 100 has a plurality of latches 200. The plurality of latches 200 can be configured to selectively move between a locked position 202 and an unlocked position 204. The locked position 202 militates against the lid 400 from being removed from the tote 100. The unlocked position 204 permits the lid 400 to be removed from the tote 100.

As shown in FIGS. 9-14, the main body 402 of the lid 400 can have a plurality of latch-receiving gaps 422. Each of the latch-receiving gaps 422 receives one of the latches 200 when each of the plurality of latches 200 can be in the locked position 202. Each the latch-receiving gaps 422 does not receive one of the latches 200 in the unlocked position 204.

In particular examples, the plurality of latches 200 includes a first latch 208, a second latch 210, a third latch 212, and a fourth latch 214, as shown in FIG. 1. The first latch 208 can be disposed on the rear side wall 116 of the hollow main body 102. The second latch 210 can be disposed on the right side wall 114 of the hollow main body 102. The third latch 212 can be disposed on the left side wall 112 of the hollow main body 102. The fourth latch 214 can be disposed on the front side wall 118 of the hollow main body 102. It should be appreciated that the number of latches 200 in the plurality of latches 200 can be scalable by a skilled artisan, within the scope of this disclosure.

Figure 10:
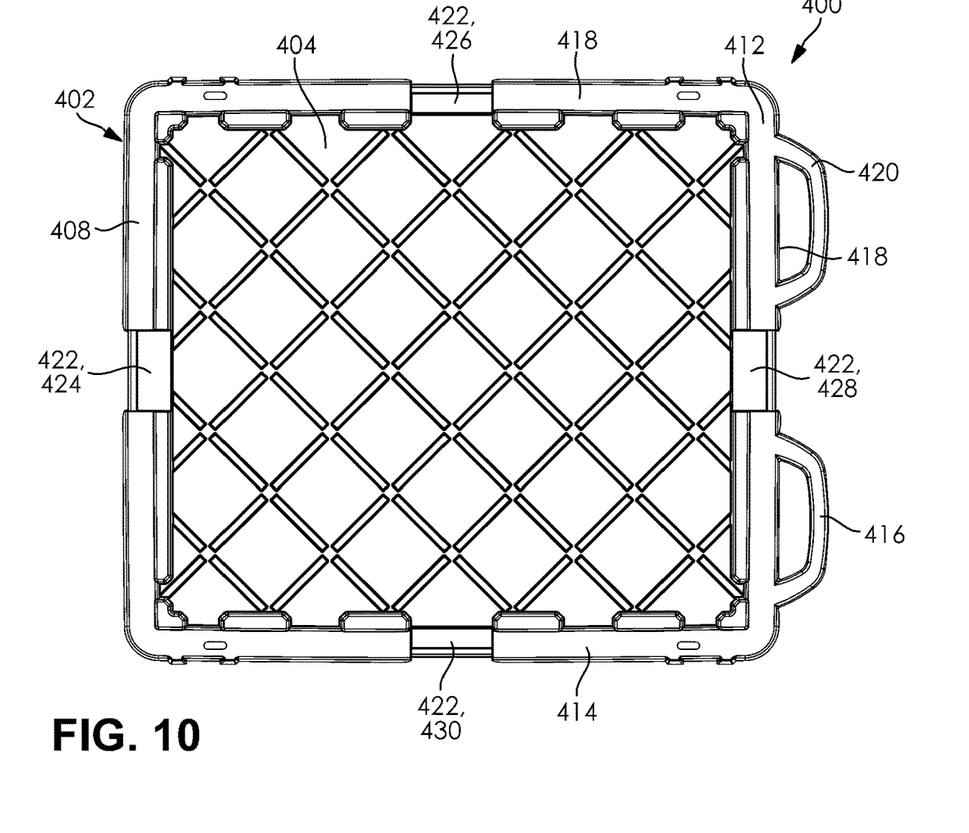
FIG. 10 is a top plan view of the lid shown in FIG. 9 without being disposed on the tote, and further showing a plurality of latch-receiving gaps.
Figure 11:
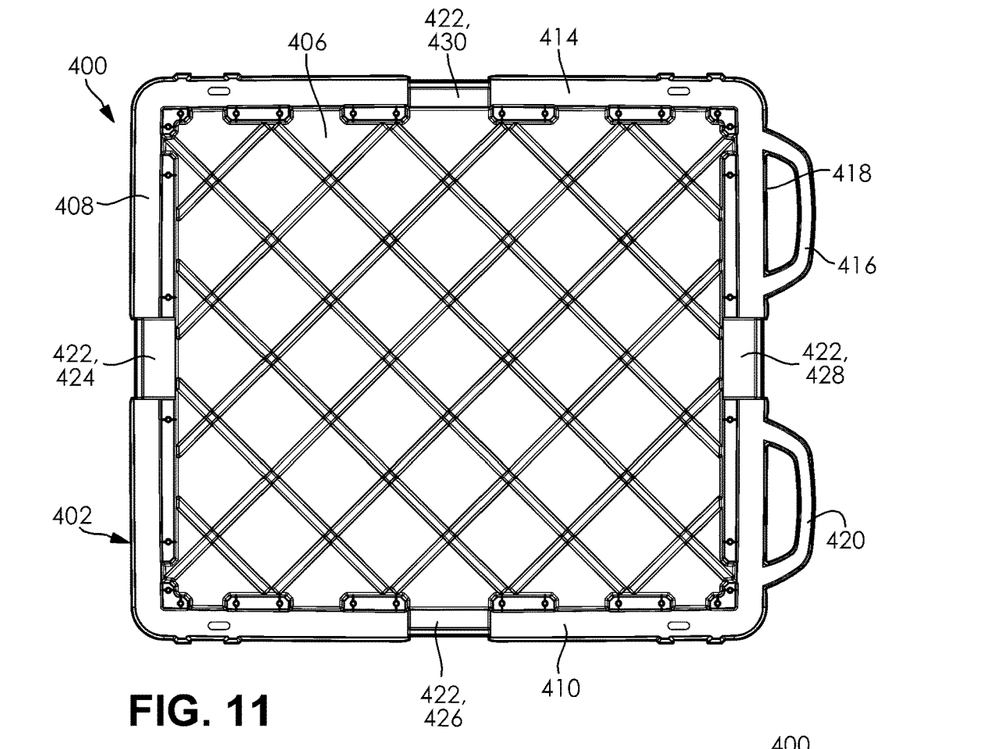
FIG. 11 is a bottom plan view of the lid shown in FIG. 10, and further showing lid handles.
Figure 12:
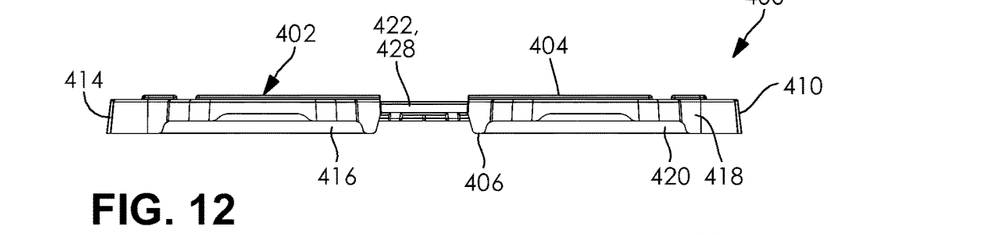
FIG. 12 is a front elevational view of the lid shown in FIG. 10, and further showing a third latch-receiving gap.
Figure 13:
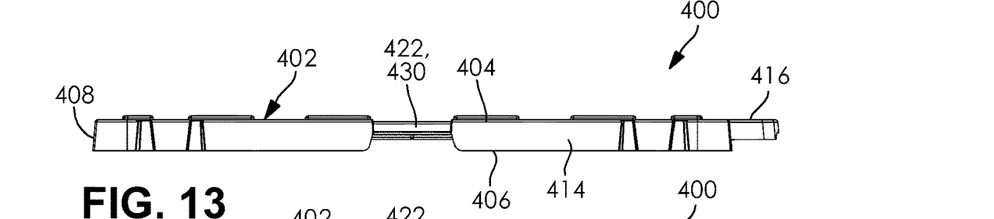
FIG. 13 is a left side elevational view of the lid shown in FIG. 10; and further showing a fourth latch-receiving gap.
Figure 14:
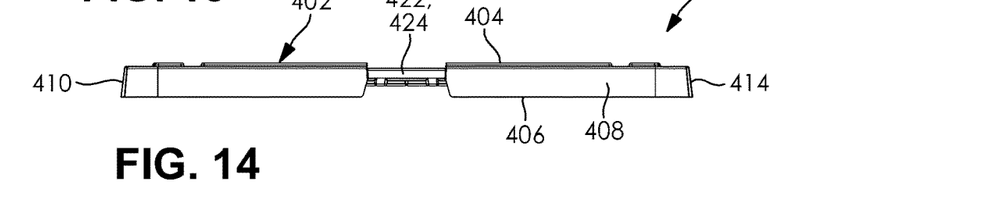
FIG. 14 is a rear elevational view of the lid shown in FIG. 10, and further showing a first latch-receiving gap.

In more particular examples, the plurality of latch-receiving gaps 422 includes a first latch-receiving gap 424, a second latch-receiving gap 426, a third latch-receiving gap 428, and a fourth latch-receiving gap 430, as shown in FIG. 10. The first latch-receiving gap 424 can be disposed on first side 408 of the main body 402. The second latch-receiving gap 426 can be disposed on the second side 410 of the main body 402. The third latch-receiving gap 428 can be disposed on the third side 412 of the main body 402. The fourth latch-receiving gap 430 can be disposed on the fourth side 414 of the main body 402. It should be appreciated that one skilled in the art can scale the number of the plurality of latch-receiving gaps 422, as desired.

Advantageously, the tote 100 can be easily repositioned by plurality of wheels 104, the tote handle 190, and the lid handle 416. The plurality of stacking supports 166 can facilitate better stacking by providing structural integrity where the tote 100 and the second tote 101 can be in the stacking combination of totes 300. Also, the plurality of latches 200 permits the lid to be secured or unsecured to the tote 100. In addition, it is believed that the cavity 122 of the tote 100 can be larger due to the increased stability from having the pair of outer wheels 138 and the central wheel 140.

While certain representative embodiments and details have been shown for purposes of illustrating the invention, it will be apparent to those skilled in the art that various changes can be made without departing from the scope of the disclosure, which is further described in the following appended claims.

What is claimed is:

1. A tote, comprising:
a hollow main body having a plurality of side walls and a base wall defining an open top and a cavity, the open top circumscribed by a rim and configured to be covered by a lid, the base wall bounded by the plurality of side walls and having a pair of outer wheel wells and a central wheel well, the central wheel well disposed between the outer wheel wells and separated from the outer wheel wells by axle supports;
a plurality of wheels, each of the wheels disposed in one of the outer wheel wells and the central wheel well; and
an axle connected to each of the wheels and rotatably supported by the axle supports of the hollow main body;
wherein:
the plurality of side walls includes a right side wall, a left side wall, a rear side wall, and a front side wall, and the pair of outer wheel wells, the central wheel well, and the axle supports are disposed in the base wall adjacent to the rear side wall, and
each of the axle supports has a first axle side wall, a second axle side wall, and an angled rear wall that connects the first axle side wall and the second axle side wall, the angled rear wall disposed intermediate the rear side wall and the base wall.

2. The tote of claim 1, wherein the first axle side wall has a first axle aperture, and the second axle side wall has a second axle aperture, and the axle is disposed through both the first axle aperture and the second axle aperture.

3. The tote of claim 2, wherein the angled rear wall has an open channel with a curved backwall, the open channel having a first channel side and a second channel side, and the open channel being in communication with the first axle aperture and the second axle aperture and rotatably receiving the axle.

4. The tote of claim 3, wherein the open channel has a channel width and a channel depth, and each of the first axle aperture and the second axle aperture has an axle aperture diameter, the channel width and the channel depth being greater than the axle aperture diameter.

5. The tote of claim 1, wherein the hollow main body has a plurality of stacking supports disposed on the front side wall of the hollow main body.

6. The tote of claim 5, wherein the plurality of stacking supports is disposed on the rear side wall and the front side wall of the hollow main body.

7. The tote of claim 5, wherein each of the stacking supports has a resting surface, the resting surface spaced apart from the rim by a resting support distance.

8. The tote of claim 7, wherein the plurality of stacking supports includes a first set of stacking supports and a second set of stacking supports.

9. The tote of claim 8, wherein each of the first set of stacking supports and the second set of stacking supports has a first rib and a second rib, the first rib spaced apart from the second rib.

10. A stacked combination of totes, comprising:
a first tote and a second tote, each of the first tote and the second tote having a hollow main body, a plurality of wheels, and an axle, the hollow main body including a plurality of side walls and a base wall defining an open top and a cavity, the open top circumscribed by a rim and configured to be covered by a lid, the base wall bounded by the plurality of side walls and having a pair of outer wheel wells and a central wheel well, the central wheel well disposed between the outer wheel wells and separated from the outer wheel wells by axle supports, and the plurality of wheels includes a pair of outer wheels and a central wheel, each of the pair of outer wheels disposed in one of the pair of outer wheel wells, the central wheel is disposed in the central wheel well, and an axle connected to each of the wheels and rotatably supported by the axle supports of the hollow main body, and
wherein:
the plurality of side walls includes a right side wall, a left side wall, a rear side wall, and a front side wall, and the pair of outer wheel wells, the central wheel well, and the axle supports are disposed in the base wall adjacent to the rear side wall,
each of the axle supports has a first axle side wall, a second axle side wall, and an angled rear wall that connects the first axle side wall and the second axle side wall, the angled rear wall disposed intermediate the rear side wall and the base wall, and
the first tote is disposed inside the cavity of the second tote, each of the pair of outer wheels of the first tote contacts and rests on one of the pair of outer wheel wells of the second tote, and the central wheel of the first tote contacts and rests on the central wheel well of the second tote.

11. The stacked combination of totes of claim 10, wherein each hollow main body of the first tote and the second tote includes a plurality of stacking supports, and each of the stacking supports of the first tote contact and rest on the rim of the second tote, and the base wall of the first tote and the base wall of the second tote are spaced apart and define a gap where each of the stacking supports of the first tote contact and rest on the rim of the second tote.

12. The stacked combination of totes of claim 11, wherein the base wall of the first tote is disposed on a first plane and the base wall of the second tote is disposed on a second plane, and the gap has a gap length sufficient to permit the first plane to be oriented substantially parallel to the second plane.

13. A tote and lid combination, comprising:
a tote having a hollow main body, a plurality of wheels, and an axle, the hollow main body including a plurality of side walls and a base wall defining an open top and a cavity, the open top circumscribed by a rim and configured to be covered by a lid, the base wall bounded by the plurality of side walls and having a pair of outer wheel wells and a central wheel well, the central wheel well disposed between the outer wheel wells and separated from the outer wheel wells by axle supports, and the plurality of wheels includes a pair of outer wheels and a central wheel, each of the pair of outer wheels disposed in one of the pair of outer wheel wells, the central wheel is disposed in the central wheel well, and the axle connected to each of the wheels and rotatably supported by the axle supports of the hollow main body; and
a lid with a main body selectively disposed over the open top of the tote;
wherein:
the plurality of side walls includes a right side wall, a left side wall, a rear side wall, and a front side wall, and the pair of outer wheel wells, the central wheel well, and the axle supports are disposed in the base wall adjacent to the rear side wall,
each of the axle supports has a first axle side wall, a second axle side wall, and an angled rear wall that connects the first axle side wall and the second axle side wall, the angled rear wall disposed intermediate the rear side wall and the base wall.

14. The tote and lid combination of claim 13, wherein the hollow main body of the tote has a tote handle disposed on the front side wall of the hollow main body, and the main body of the lid has a lid handle disposed on an outer edge of the main body of the lid, the lid handle aligned with the tote handle.

15. The tote and lid combination of claim 14, wherein at least one of the tote handle and the lid handle has bracing disposed therein.

16. The tote and lid combination of claim 13, wherein the hollow main body of the tote has a plurality of latches, each of the latches configured to move between a locked position and unlocked position, the locked position militating against the lid from being removed from the tote.

17. The tote and lid combination of claim 16, wherein the main body of the lid has a plurality of latch-receiving gaps, each of the latch-receiving gaps configured to receive one of the latches, where each of the latches is in the locked position upon being received by one of the latch-receiving gaps and each of the latches is in the unlocked position upon not being received by one of the latch-receiving gaps.

18. The tote and lid combination of claim 17, wherein the plurality of side walls of the tote includes a rear side wall, a right side wall, a left side wall, and a front side wall, and the plurality of latches includes a first latch, a second latch, a third latch, and a fourth latch, and the first latch is disposed on the rear side wall, the second latch is disposed on the right side wall, third latch is disposed on the left side wall, and the fourth latch is disposed on the front side wall.

* * * * *